(12) United States Patent
Chen (10) Patent No.: US 7,971,235 B2
(45) Date of Patent: Jun. 28, 2011

(54) USER AUTHORIZATION FOR SERVICES IN A WIRELESS COMMUNICATIONS NETWORK

(75) Inventor: Xin Chen, Basingstoke (GB)

(73) Assignee: Fujitsu Limited, Kawasaki (JP)

( * ) Notice: Subject to any disclaimer, the term of this patent is extended or adjusted under 35 U.S.C. 154(b) by 1329 days.

(21) Appl. No.: 11/252,087

(22) Filed: Oct. 18, 2005

(65) Prior Publication Data

US 2006/0123470 A1 Jun. 8, 2006

(30) Foreign Application Priority Data

Oct. 20, 2004 (GB) .................................. 0423301.1

(51) Int. Cl.
*G06F 7/04* (2006.01)
*G06F 15/16* (2006.01)
*G06F 17/30* (2006.01)
*G06F 15/173* (2006.01)
*H04L 29/06* (2006.01)

(52) U.S. Cl. ............. 726/6; 709/224; 709/225; 709/229

(58) Field of Classification Search .................. 709/224, 709/225, 229; 726/5

See application file for complete search history.

(56) References Cited

U.S. PATENT DOCUMENTS

| 6,119,160 | A * | 9/2000 | Zhang et al. ................... 709/224 |
| 6,430,276 | B1 | 8/2002 | Bouvier et al. ................ 379/121 |
| 2002/0069278 | A1 * | 6/2002 | Forslow ........................ 709/225 |
| 2009/0080387 | A1 * | 3/2009 | Dell'Uomo et al. .......... 370/338 |

FOREIGN PATENT DOCUMENTS

| EP | 05256259.2 | 2/2006 |
| EP | 06011179.6 | 8/2006 |
| JP | 2001169341 A | 6/2001 |
| JP | 2005512358 | 4/2005 |
| WO | WO 01/17310 A1 | 3/2001 |
| WO | WO 01/72009 A2 | 9/2001 |
| WO | 03026245 A2 | 3/2003 |
| WO | WO 03/055237 A2 | 7/2003 |
| WO | WO 03/073783 A1 | 9/2003 |
| WO | WO 2004/064442 A1 | 7/2004 |

OTHER PUBLICATIONS

Request for Comments: 2058 Remote Authentication Dial in User Service (RADIUS) C. Rigney Livingston, A. Rubens Merit, W. Simpson Daydreamer and S. Willens Livingston Jan. 1997.*
L2TP, PPTP, and Ip-in-Ip Tunneling http://docs.snake.de/TNT/7/netcfg/tntunnel.htm Copyright © 1999, Ascend Communications, Inc. All rights reserved.*
3GPP TS 23.060 (Jun. 2002) $3^{rd}$ Generation Partnership Project; Technical Specification Group Services and System Aspects; General Packet Radio Service (GPRS); Service description; Stage 2; (Release 5).
3GPP TS 24.008 (Jun. 2004) $3^{rd}$ Generation Partnership Project; Technical Specification Group Core Network; Mobile radio interface layer 3 specification; Core Network Protocols; Stage 3 (Release 1999).
Notification of Reasons for Refusal dated Sep. 7, 2010 received in corresponding Japanese Patent Application No. 2005-304796.

* cited by examiner

*Primary Examiner* — Farid Homayounmehr
*Assistant Examiner* — Benjamin A Kaplan
(74) *Attorney, Agent, or Firm* — Murphy & King, P.C.

(57) ABSTRACT

A method of user authorization for services in a wireless communications network including the steps of: establishing a connection between user equipment and an authorization server of the network; the user equipment providing user identification to the authorization server; the authorization server retrieving authorization data based on the user identification as to a service available to that user; the authorization server returning authorization to the user equipment for a service indicated by the authorization data; and the user equipment establishing a communication path to the service using the authorization

44 Claims, 8 Drawing Sheets

USER AUTHORIZATION FOR SERVICES IN A WIRELESS COMMUNICATIONS NETWORK

FIELD OF THE INVENTION

The present invention relates generally to wireless communications networks. Such networks can be used for telephony as well as data transfer. The invention has applications in any wireless network including mobile telephone networks operated by any of the large operators, as well as potentially being used for smaller private networks operating wirelessly.

DESCRIPTION OF THE RELATED ART

Traditionally, wireless local area networks (hereinafter referred to as WLANs) offered only one type of service; that is internet access for the user. Therefore there has been no need for explicit service authorization; once the user has been identified by the wireless network provider, service is granted. With the advent of voice data being sent over the internet, and thus also over WLANs such as those forming part of the internet using voice over internet protocol (VOIP), as well as other services such as information management system (IMS) and multi-media messaging service messages (MMS) along with the short message service (SMS), there is an increasing requirement for access to services other than the internet. This is in particular the case now that WLANs are being interworked with third generation (3G) mobile telephone networks which support a much higher data rate and many more services than previously available.

Therefore, an explicit service authorization procedure is required to allow the user to request particular services and to allow the network to verify whether the user is authorised to access the service. This decision can be based on user subscription information, local policy and other relevant factors.

There are several pre-conditions before any wireless system permits the user to access services. The user must be identified; the service required must be identified; the user authorised for that service; and the user connected to the service.

These pre-conditions are satisfied using three steps of authentication, service authorization and tunnelling set-up, which are implemented as follows in prior art 2/2.5G and 3G systems.

Firstly, the user is identified using an authentication step, in which user identification is provided to the system and the system checks the identification. Subsequently, in an authorization step, the user specifies the service requested and the system checks for whether the user can use the service and gives an authorization if appropriate. Finally, if the user is authorised there is a connection step to form a data link (known as a tunnel) between the service and the user equipment, for the exchange of data with the service.

Service Authorization in 2G/2.5G

In 2 and 2.5G systems the step of service authorization is aimed at discovering the tunnel end point where the application servers for the desired service can be accessed and negotiating quality of service. For example quality of service in terms of data rate and other factors may be dependent on the user equipment or user device or the price paid by the user for network subscription. Service authorization requests are rejected if, for example, the user has unsubscribed or does not have sufficient credit left to access the service.

Figure 1:
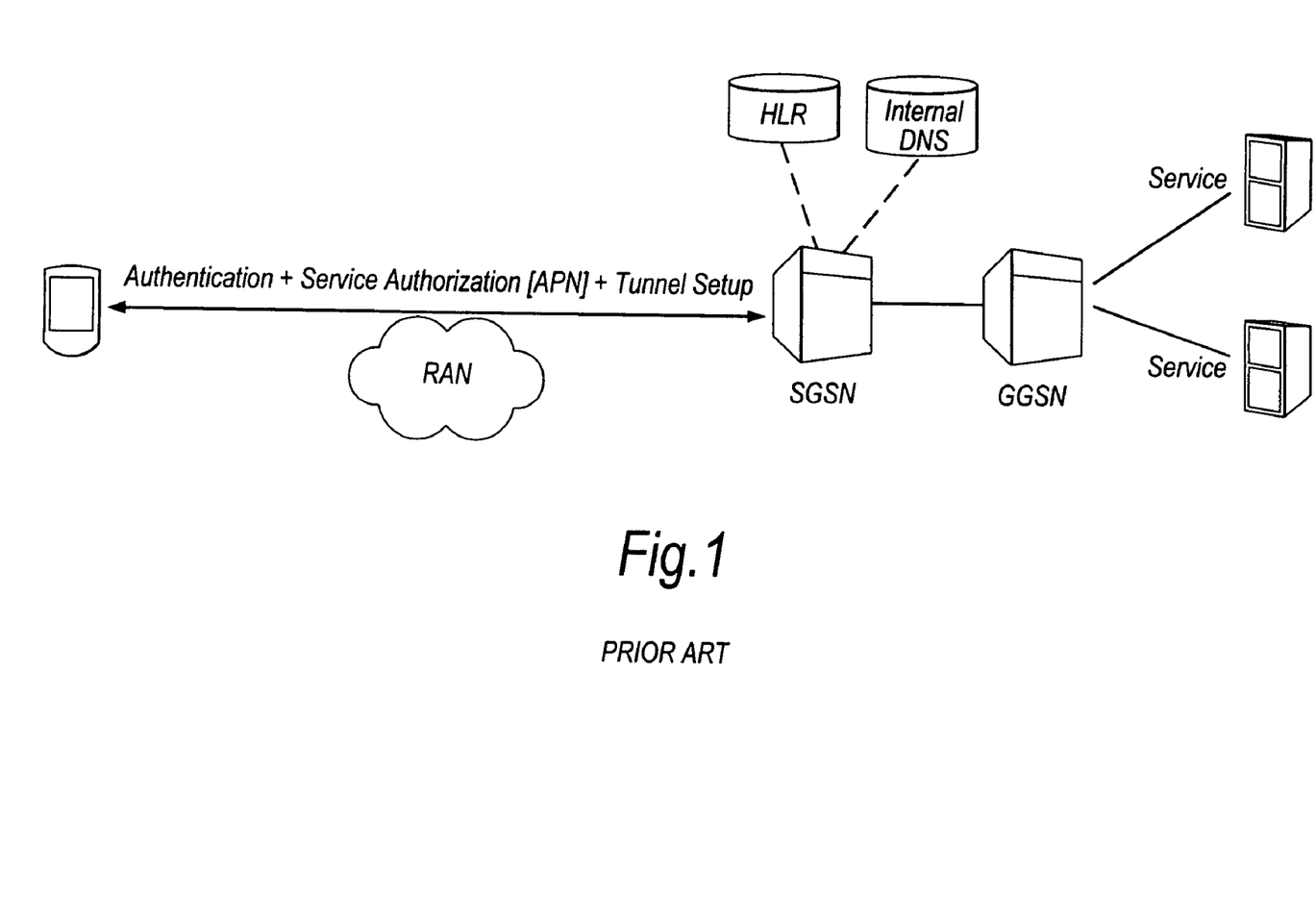
FIG. 1 shows a schematic representation of the service authorization architecture in a prior art 2G/2.5G system.

FIG. 1 shows a schematic representation of the second generation (2G or 2.5G) system. User equipment (UE) is linked by a radio access network to a serving GRPS node (SGSN). This forms part of the core network (the wired network, usually managed by a single operator). The wired network also includes a database of user information known in 2G as the Home Location Register (HLR) and a Domain Name Server (DNS) which are both attached to the SGSN. The SGSN is attached to a gateway GRPS node (GGSN) which is connected to services.

The authentication, service authorization and tunnel establishment are all carried out through the SGSN.

In a 2G/2.5G authentication method, the UE sends user identification to the SGSN. The SGSN uses information on the user stored in the HLR to authenticate the user. Subsequently, in a service authorization method, the user equipment (now authenticated by the network) requests a service via the SGSN.

The service request in this prior art example uses the Access Point Name (APN) for the service. The APN identifies the service required and is a Fully Qualified Domain Name (FQDN) of the IP network where the service is hosted. This is in effect the end point of the tunnel and is provided by the user equipment to the SGSN.

The service request is authorised by the SGSN. The IP address of the tunnel end point (the GGSN) is then obtained from the internal DNS and the SGSN establishes a tunnel to the GGSN connected to the selected service. In fact the connection initially established for authentication is also used for service authorization and set up of a tunnel. The tunnel is set up in two portions: between the user and the SGSN and between the SGSN and the GGSN. Thus the SGSN is a tunnel midpoint.

If the user requires a different service, a new service authorization and tunnelling set up is required.

For more details on this prior art system the reader is referred to 3GPPTS23.060 and 3GPPTS24.008.

One disadvantage of the 2G prior art architecture is that there is no provision for using a different service without a second authorization step. A second disadvantage is that the SGSN is involved in all authorization and authentication steps as well as forming a tunnel mid-point as long as the connection to the service is established.

Service Authorization in 3G

Figure 2:
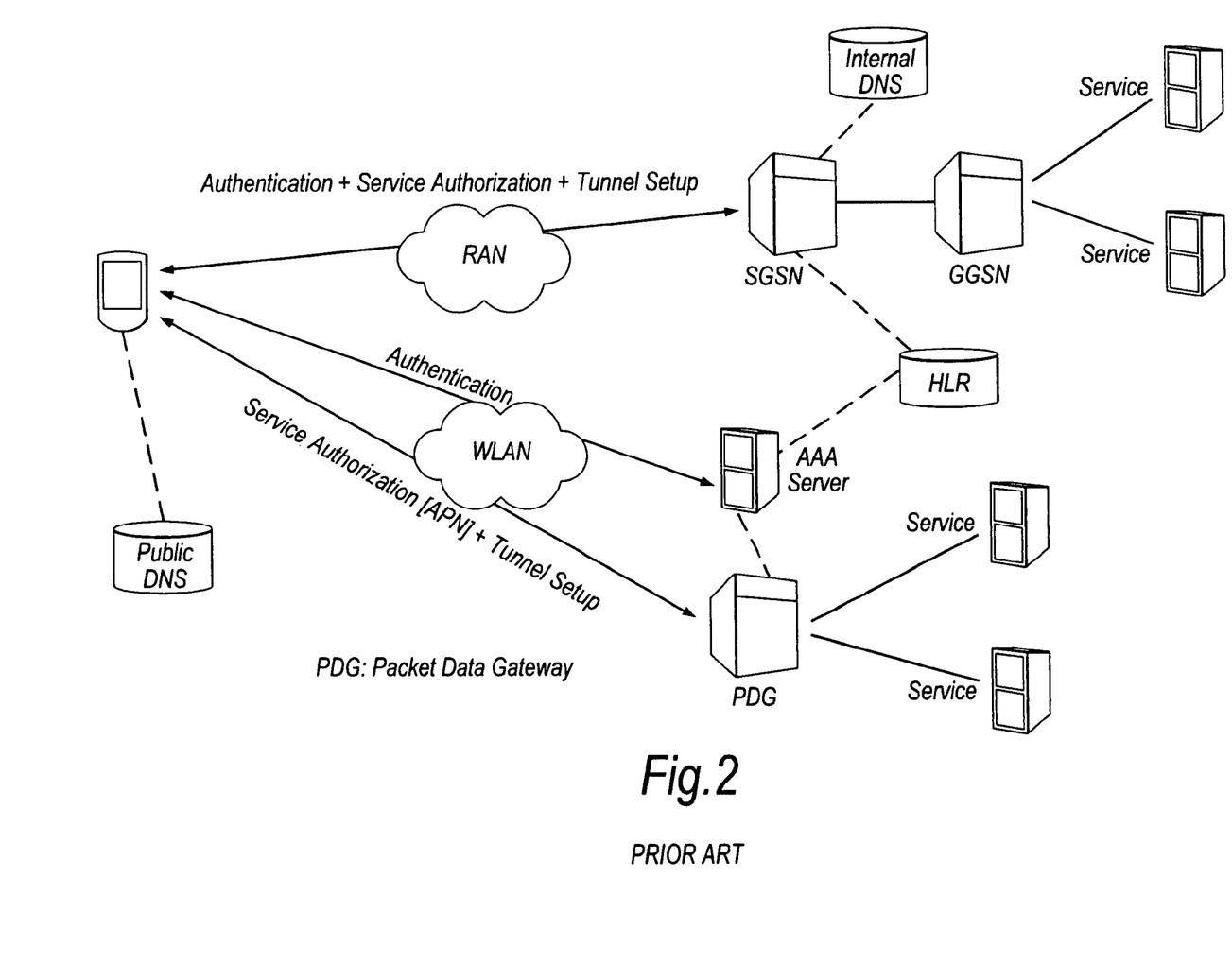
FIG. 2 shows a schematic representation of service authorization architecture in a prior art 3G system.

FIG. 2 shows an existing 3G architecture. The top section of the diagram shows the arrangements explained above in 2G and 2.5G. The prior art 3G architecture provides in tandem a extra architecture for use with different services on the same network. Here, authentication over the wireless network and in particular over a WLAN is separated from service authorization and tunnel establishment. In particular, an Access, and Authentication server or AAA server is provided for authentication purposes. The AAA server is connected to the HLR for authentication purposes.

The US communicates directly with the AAA server for authentication but not for subsequent steps. Service authorization and tunnel establishment are instead carried out using a packet data gateway (PDG) which is connected in the core network to various services. The user equipment is also connected over a wireless network to a public DNS. In this prior art 3G example, the APN is again used for service authorization but the UE accesses a public DNS with the APN. The DNS returns the IP address of the PDG.

The IP security protocol (IPSec) is employed for tunnel establishment to a service via the PDG.

The reader is referred to 3GPPTS23.234 and RFC2401 for further architecture details.

Figure 3:
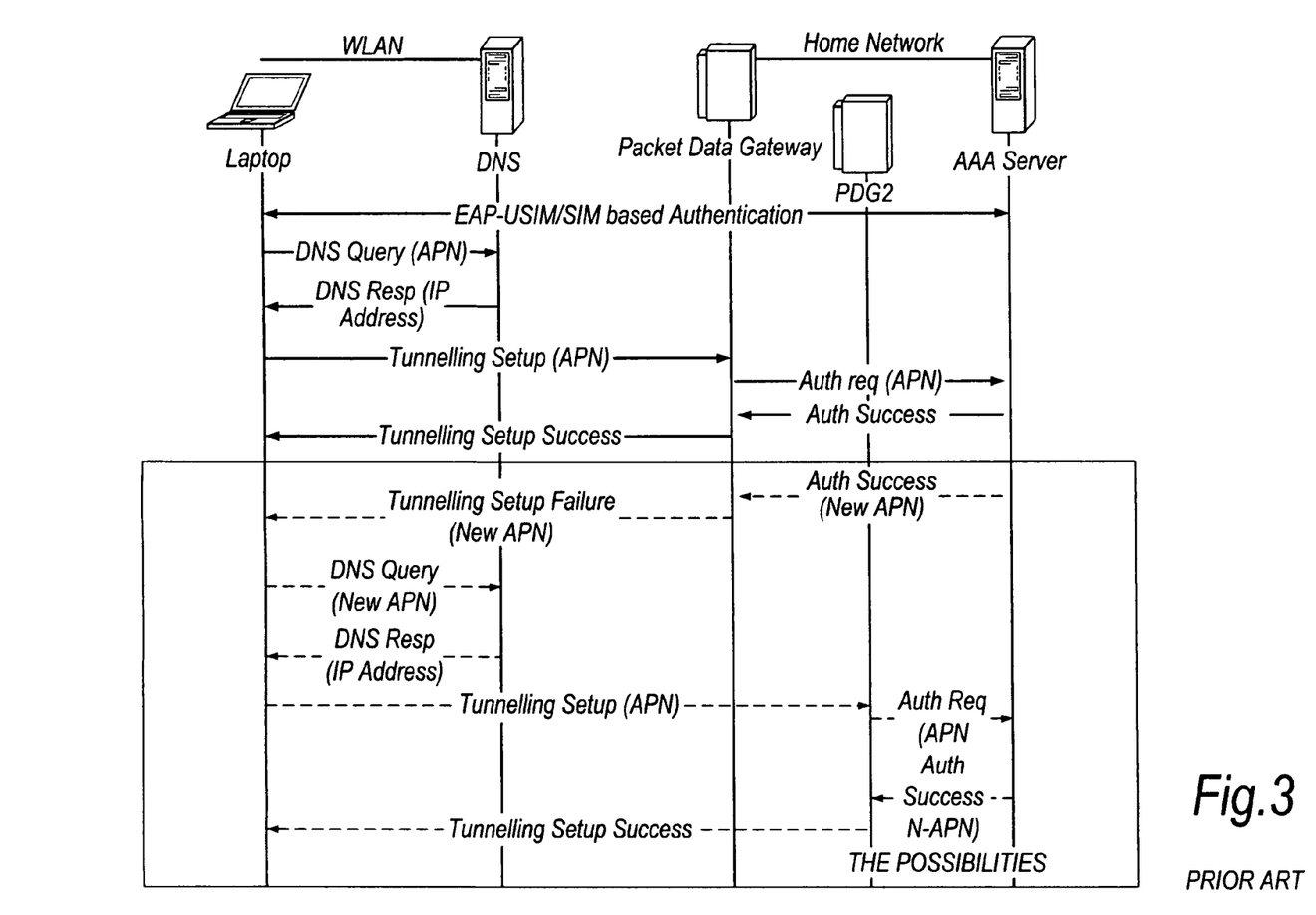
FIG. 3 is a sequential data flow diagram showing communication between different entities in the prior art 3G architecture shown in FIG. 2.

FIG. 3 is a sequential data flow diagram showing communications between different entities in the prior art 3G architecture shown in FIG. 2. The UE and DNS on the left are part of the public wireless network and the server and PDGs on the right are part of the wired home network.

Initially there is an authentication step between the UE and AAA server to identify the user based on EAP-USIM/SIM, the relevant extendable authentication protocol for AAA functions using the subscriber identity module (SIM) or universal subscriber identity module (USIM) for UMTS (Universal Mobile Telecommunication System).

In a first service authorization step the user equipment shown here as a laptop sends a DNS query in the form of an APN to the public domain DNS. The response is an IP address which is that of the packet data gateway (PDG) for the tunnel set-up to the PDG specified by the IP address. The UE then sends a tunnelling request to the IP address of the PDG and the PDG must then in turn request authorization for the user from the AAA server. If authorization is granted the tunnelling set-up is successful a the user can access the service.

The shaded lower part of the diagram shows the case in which the user is authorised to access the specified service but the default gateway is no longer appropriate. This is the case, for example, if the core network has been restructured. The AAA server than returns a new APN to the default PDG initially selected and the PDG returns a tunnelling set-up failure message to the UE enclosing a new APN. The UE must then send a fresh DNS query to obtain the relevant IP address of the new PDG (shown here as PDG2) and a second tunnelling set-up step with its attendant authorization step is required before tunnelling can be achieved.

Figure 4:
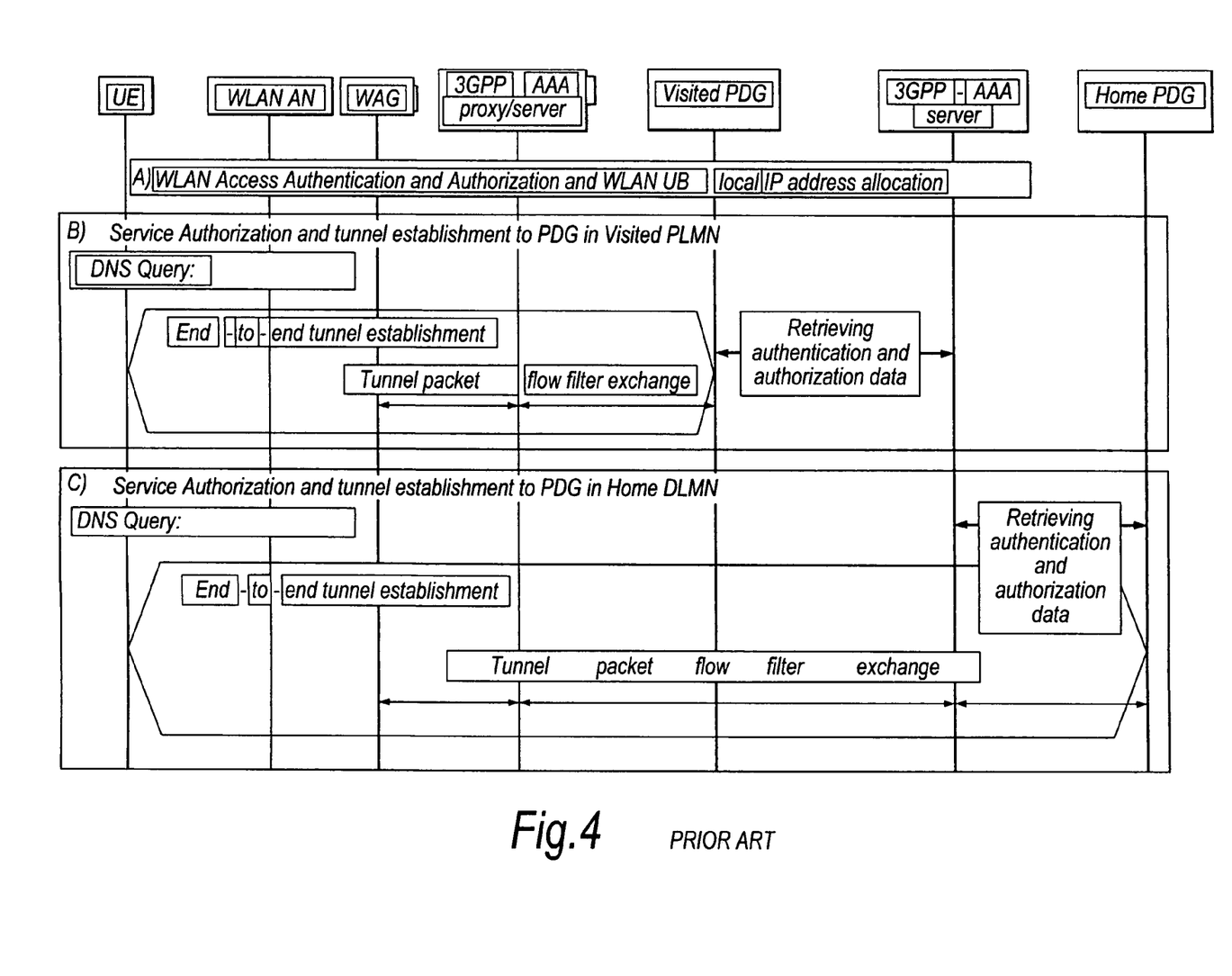
FIG. 4 is a communication chart showing the actions in the 3G prior art system when user equipment is operated at a home network in a visited network.

FIG. 4 shows the 3G prior art system when the user equipment is operated out of the home network in a visited network (so-called roaming).

The entities shown to the left in the diagram are user equipment, a WLAN node (WLAN AN), a wireless is access gateway (WAG), a 3GPP AAA proxy server and a visited PDG. These elements are in the visited network. To the right there is shown a 3GPP AAA server of the home network and the home PDG. The home and visited network are typically connected by standard wired connections.

A first step shown as A is a WLAN access, authentication and authorization step for the user equipment. The proxy server advertises its network information including a network identifier to the UE and the UE uses the identifier to attach a prefix to the APN to form a visiting APN (V-APN) which identifies the visited network and sends the information on to the home AAA server.

Sections B and C are alternative scenarios for service authorization and tunnel establishment to a PDG depending on service availability in the visited network.

In section B, which is a preferred scenario, the visited network is able to supply the service requested. Initially the DNS query is sent to a DNS in the visited network (this is true of both sections B and C). In section B the visited network is able to provide the service requested and the visited DNS (not shown) returns an IP address of a PDG in the visited network. Authorization is requested by the visited PDG, which must communicate with both the home and visited AAA servers. Once authorization has been given by both AAA servers, a tunnel is set up with the visited PDG. Therefore the end to end tunnel establishment is entirely within the visited network. The tunnel packet flow filter exchange shown refers to the carrier protocol for packet routing which is outside the scope of the present invention.

In section C, however, the requested service is not available from the visited network; the UE receives a rejection message from the visited networking therefore the UE needs to use the home APN to query the DNS; the DNS in the visited network returns an IP address of a PDG in the home network. Here the data must be sent from the home network, across the core of the visited network and then be converted to a wireless signal in the WAG for transmission to the UE.

There are a number of disadvantages to this authorization architecture and method in both home and roaming situations. Firstly, the use of a public DNS server means that the system operator exposes the IP addresses of its PDGs to third parties. For example, the wireless network may be owned by a third party who could become aware of information about an operator's network topology, which is commercially sensitive material.

Furthermore, use of the public DNS system means that when an operator changes a network topology and this affects the IP addresses of the relevant PDGs, such changes will have to be propagated to the DNS system which may cause a race condition problem.

Since each APN is stored in the UE (sometimes referred to as a terminal) to allow the DNS query as the first step of the authorization, new APNs can only be introduced by changing the terminal configuration.

Moreover, each service authorization authorises a single tunnel only. Thus if the user wishes to access several services there may be a delay each time a new service is accessed.

Although the prior art service authorization discussed above is suitable for use with WLAN, a specific wireless protocol, it is not necessarily advantageous for any different types of wireless access network which may develop and move away from the WLAN standard.

Finally, the first tunnel set up can fail for two reasons, that is if service is not available from the visited network in the roaming case and if the APN has been changed by the operator. Such failure impacts on overall service access delay and can waste radio resources.

It is desirable to provide an authorization network and method and suitable network entities which overcome or least mitigate one or more of the above disadvantages. Moreover, it is desirable to provide such a method, network and entities which are sufficiently flexible to be incorporated in future systems and are ideally not restricted to specific technologies or protocols.

SUMMARY OF THE INVENTION

In accordance with a first aspect of the invention there is provided a method of user authorization for a service in a wireless communications network including the steps of establishing a connection between user equipment and an authorization server of the network; the user equipment providing user identification to the authorization server; the authorization server retrieving authorization data based on the user identification as to a service available to that user; the authorization server returning authorization to the user equipment for the service indicated by the authorization data; and the user equipment establishing a communication path to the service using the authorization.

In essence, the present invention decouples the service authorization function from the tunnel establishment. Thus, in contrast with the 3G prior art solution described, authorization enables the establishment of a new communication path to the service which path does not include the authorization server. Previously the same communication path had been used as required for the authorization request.

Providing separate authorization and establishment of a communication path for service access allows the technology involved in these different processes to evolve independently. Thus connection to the PDG for service use was previously inextricably linked with connection for authorization.

The 3G Partnership Project, 3GPP decided that the prior art 3G-WLAN architecture would use IPSec as the tunnelling protocol. However, IPSec does not support mobility. Because at the time of the standards were developed, there was no requirement to support mobility between different access networks IPSec was seen as the easiest and fastest way to enrol the market.

However, in the future (NGN or other wireless network to be developed), mobility may well be required across different access networks. In this case, IPSec will no longer be sufficient anymore, so a different tunnelling protocol will be needed to support mobility, such as Mobile IP.

However, the problem of the prior art 3G solution is that it uses tunnelling protocol also for service authorization, therefore, it requires modification of the tunnelling protocol, for example, to carry an APN. Therefore, if the prior art 3G solution is used in the future, similar modification is required to any other tunnelling protocol which is developed to support mobility, e.g. Mobile IP.

Another advantage is that the invention does not require a public DNS holding the address of the service. The connections defined are made directly with an authorization server of the network (which is thus preferably part of the home wired network), and this overcomes the disadvantages of the public DNS mentioned with respect to the prior art.

Only the IP address of the authorization server may need to be propagated to the public DNS domain. It is fair to assume that it will be unusual to change the IP address of the authorization server and that there will be only a few authorization servers per network. This limits any exposure of network topology and cuts out the problems with brace condition. Of course, the home authorization server IP could also be pre-configured in the terminal which would eliminate the need for it to be provided by a public DNS.

Furthermore the solution is generic and not based on any particular type of access network. The invention applies to any type of access network, including 3G, WLAN, ads.

Preferably, the connection between the user equipment and the authorization server is a secure connection with data encryption and communication between the user equipment and the authorization server is carried out under the secure connection.

Such a secure connection further improves the safety of the user authorization.

Specifically, communication between the user equipment and the authorization server once the connection is established can use HTTP (hypertext transfer protocol) or HTTPS (secure hypertext transfer protocol) for document request and transfer.

Using HTTP as the protocol has several benefits: it is already supported by most terminals; and it is easy to integrate with other services and provides user friendly web page interfaces.

Advantageously, a browser application operating on the user equipment displays services available on return of the authorization and user selection of an available service allows establishment of the communication path. Web page-type user interfaces are widely acceptable to the public and intuitive in use.

According to preferred operation of a wireless network, the communication path gives a tunnel forming a secure encrypted communication path for data transfer between the user equipment and the service.

In an advantageous embodiment, a plurality of services may be authorised, the authorization server preferably returning a single authorization including individual specific authorizations for specific services.

Here, each server authorization can authorise multiple tunnels, so there is no need to re-authorise each time a tunnel is established. This leads to more efficient use of network resources. The authorization server may simply retrieve authorization data based on the user identification as to all the services available to that user. The authorization server may authorise a plurality of services separately but preferably returns a single authorization with individual specific authorizations. The services authorised may be listed in a display created by a browser application for selection by the user.

Advantageously, the user equipment establishes a communication path to each specific service using the specific authorizations.

For simplicity of use, the authorization may be in the form of an address for each service available to the user, to which address the communication path is formed.

Specifically the address could be an IP address as known in the art. The IP address is that of the current PDG for the service requested.

Since the method of preferred embodiments of the invention is suitable for user authorization of several services at the same time, it is possible for the user equipment to send an authorization request without specifying a service by simply providing user identification. However, the user equipment may also provide one or more service names to the authorization server with the user identification.

In this case only authorizations for those services might be returned to the user. Alternatively, service selection could have no effect, so that all possible services are authorised with no reference to which was selected.

If the user equipment does not specify the service required when providing user identification, the authorization returned may be specific authorizations for all services available to the user. The same user equipment may provide functionality for any of the user authorization methods described above with respect to service specification depending on the preferences of the user at the time the method is carried out.

In preferred embodiments, the service is specified by its APN. All these various methods can be advantageous in that there is no need to store all APNs in the terminal, because the authorization server can automatically authorize all services if required. Thus even if a new service is introduced, no terminal configuration is required.

The method according to the invention may also include an initial authentication step provided between the user equipment and an authentication server.

Depending on the specific network topology and other factors, it can be advantageous if the authentication and authorization servers are one and the same and form an authorization and authentication server and the authorization data is therefore retrieved internally within the authorization and authentication server.

Alternatively, the authorization server may be provided as a separate server from the authentication server and authorization data may be retrieved by the authorization server from the authentication server within the core network. Alternatively, the authorisation server may be linked directly to a database holding the user subscription profile and authorisation data retrieved from this database.

The authorization server as described previously may have further functions in facilitating communication to the service authorised. Preferably, the authorization server installs communication path parameters for at least one service indicated by the authorization data to facilitate establishment of a communication path.

In a roaming scenario, the user equipment is outside the range of a home network but services can be provided by agreement between the home network and a visited network in which the user equipment is situated. In a method as discussed previously applied to a visited network the user authorization procedure can be as follows:

user equipment has roamed to a visited network when outside the range of its home network;

the authorization server is a visited authorization server which relays user identification to a home authorization server, receives home authorization for any home service to be provided by the home network, retrieves visited user authorization data as to any visited service available to the user and returns authorization for any home service and authorizations for any visited services to be provided by the visited network.

According to the agreements between the networks it is the home network which specifies which visited services can be provided by the visited network. Therefore, the visited authorization service may also receive information as to any visited service permitted by the home network.

When a communication path is provided between the UE and a visited service this can be achieved by a tunnel established directly between the user equipment and a visited PDG.

In accordance with a further aspect of the present invention there is provided a method of user authorization for authorization of roaming services in a visited wireless communications network from a home wireless communications network including the steps of: an authorization server of the home network receiving user identification from the visited network; the home authorization server retrieving authorization data based on the user identification as to the home service or services available to that user from the home network, returning authorization the visited network for at least one home service indicated by the authorization data; and a communication path being established from the visited network to the at least one home service using the authorization.

As before, the home authorization server may return information as to any visited services permitted by the home network to be provided by the visited network and a tunnel to the service is preferably established between the user equipment and a home PDG via the visited network for any home service.

In these roaming methods, one preferred arrangement is that visited services are provided as a default and home services are only provided when an equivalent visited service is not available. Alternatively, home services may be provided as a default depending on the agreement between the network providers.

In accordance with a further aspect of the present invention there is provided a wireless communications network in which the user requires authorization to utilise a service, comprising user equipment and an authorization server operable to establish a secure connection therebetween; the user equipment being furthermore operable to provide user identification to the authorization server; and the authorization server being operable to retrieve user authorization data based on the user identification as to the service or services available to that user and to return authorization to the user equipment for at least one service indicated by the authorization data; and the user equipment being operable to establish a communication path to the at least one service using the authorization.

According to a further aspect of the invention there is provided a home wireless communications network in which the user requires authorization to utilise a home service, or a service provided by a visited wireless communications network when the user equipment is roaming, comprising: a home authorization server operable to receive user identification from the visited network; the home authorization server being operable to retrieve user authorization data based on the user identification as to the home service or home services available to that user and to return home authorization to the visited network for at least one home service indicated by the authorization data; and at least one home service being operable to receive a communication path using the authorization.

The network of these further aspects may need to be adapted to carry out and/or comprises means for carrying out or be operable to carry out any of the methods previously described.

According to a further aspect of the invention there is provided an authorization server providing user authorization for services in a wireless communications network comprising: means for establishing a connection with user equipment; means for receiving user identification from the user equipment; means for retrieving authorization data based on the user identification as to the service or services available to that user; and means for returning authorization to the user equipment for at least one service indicated by the authorization data allowing the user equipment to establish a new communication path to the at least one service using the authorization.

The authorization server may be adapted to carry out and/or comprise means for carrying out or be operable to carry out any of the method steps of any authorization server previously described.

According to a further aspect of the invention there is provided user equipment requiring user authorization for services in a wireless communications network comprising: means for establishing a connection to an authorization server of the network; means for providing user identification to the authorization server; means for receiving authorization for at least one service returned by the authorization server and using it to establish a new communication path to the at least one service.

The user equipment may be adapted to carry out and/or comprise means for carrying out or be operable to carry out any of the method steps carried out by user equipment as previously described.

In any of the above aspects, the various features may be implemented in hardware, or as software modules running on one or more processors. Features of one aspect may be applied to any of the other aspects.

The invention also provides a computer program or a computer program product for carrying out any of the methods described herein or a set of such programs or program products, and a computer readable medium (or a set of computer readable media) having stored thereon a program (or a set of programs) for carrying out any of the methods described herein. One or more computer programs embodying the invention may be stored on a computer-readable medium, or could, for example, be in the form of a signal such as a downloadable data signal provided from an Internet web site, or it could be in any other form.

BRIEF DESCRIPTION OF THE DRAWINGS

Preferred features of the present invention will now be described, purely by way of example, with reference to thee accompanying drawings in which.

DETAILED DESCRIPTION OF THE PREFERRED EMBODIMENTS

Figure 5:
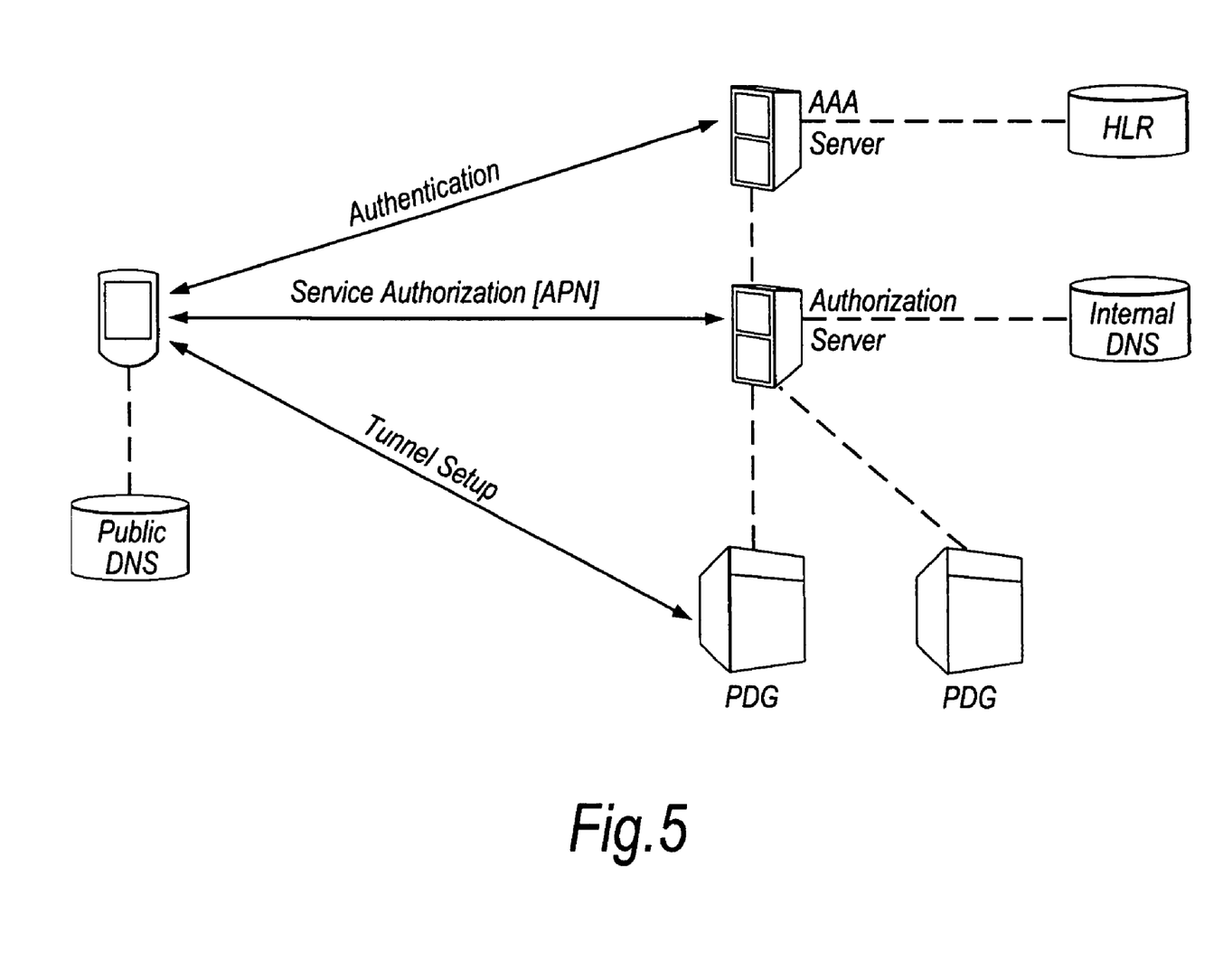
FIG. 5 shows a service authorization architecture according to an embodiment of the invention.

FIG. 5 shows entities of a wireless network involved in service authorization according to an embodiment of the invention. It should be noted that the term used herein may well correspond to a particular protocol and the skilled reader will appreciate that the concepts of the invention are equally applicable to other and even future protocols. For example, the user device terminal or equipment is referred to generally herein as UE in accordance with 3G standards. Nevertheless, it is apparent that such terminology is not limiting but rather that the function of each network entity described is of the essence and not its nomenclature.

In FIG. 5, a UE shown as a PDA (which could equally be a mobile telephone, laptop or any other wireless device) connects wirelessly to a public DNS which is used by the UE in this case to retrieve the IP address of the authorization server. The UE also links wirelessly to a AAA server which is connected within the core network to a user database referred to herein as the HLR. The UE also connects wirelessly to an authorization server which is linked within the home network to the AAA server and an internal DNS used to retrieve the IP address of the PDG through which a specific service is accessed. Finally, the UE connects wirelessly to a PDG for tunnel set-up. The PDGs are linked to the authorization server for the reasons described in the following.

FIG. 5 is a clear graphical indication of the separation of service authorization and tunnel set-up. It indicates the communication path in the form of a tunnel directly between the UE and the service and also illustrates that the service authorization is carried out with a different entity of the network than the tunnel set-up.

Figure 6:
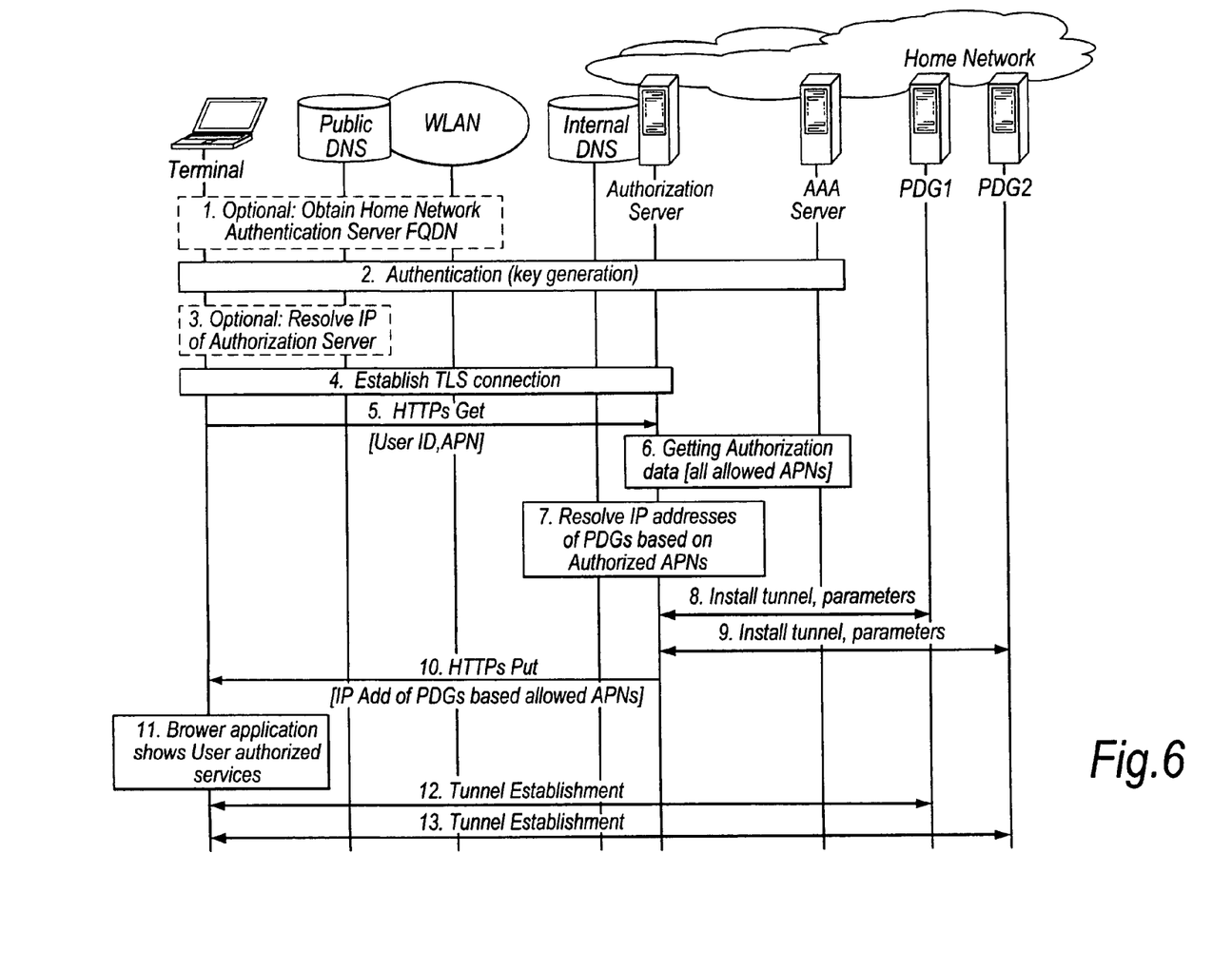
FIG. 6 is a sequential data flow diagram showing communications between different entities in the architecture shown in FIG. 5.

FIG. 6 gives a detailed sequential explanation of authorization according to one embodiment of the invention. The steps are further explained below:

1. The terminal or UE obtains the FQDN of the Home Authorization service in a network selection phase. This step is optional because the FQDN could be pre-configured by the home operator in the terminal. It is unlikely to change often.

2. Authentication takes place between the terminal and the AAA server, and a security key is also generated for authentication of the user.

3. The terminal resolves the IP address of the Authorization Server from the DNS server in the WLAN. This step is also optional if the IP address of the Authorization server is pre-configured in the terminal. There will not be many authorization servers in operator's network and their IP addresses will not change often.

4. Based on the key generated during authentication, the terminal establishes a TLS (Transport Layer Security) connection with the Authorization Server. How the TLS is established is outside the scope of the invention, but available from the TLS specification.

5. The user chooses the service requested and the terminal sends an HTTPs GET containing the user id and requested APN to the authorization server.

6. The authorization server retrieves user subscription data from the AAA Server which has an interface with HLR. The AAA Server authorises all the services which the user is allowed to access and returns all the corresponding APNs to the Authorization Server.

7. The authorization server resolves the IP addresses of the PDGs based on returned APNs from an internal DNS server.

8. The authorization server then installs the tunnel parameters to a PDG. Such parameters include, for example, user id, tunnel id, and quality of service (QoS) parameters.

9. The authorization server installs tunnel parameters to any further PDGs.

10. The authorization server returns an HTTPs PUT containing the IP addresses of the PDGs and corresponding tunnelling parameters.

11. The Browser application in the terminal can display a webpage-like interface to the user indicating all the services that the user can access.

12. The user then can choose the service he/she wants to access by clicking the link to the service which appears in the browser application. This action triggers the tunnelling establishment to the corresponding PDG.

13. The user can choose further services without any extra tunnelling set up because all possible tunnels to available services have already been prepared.

Figure 7:
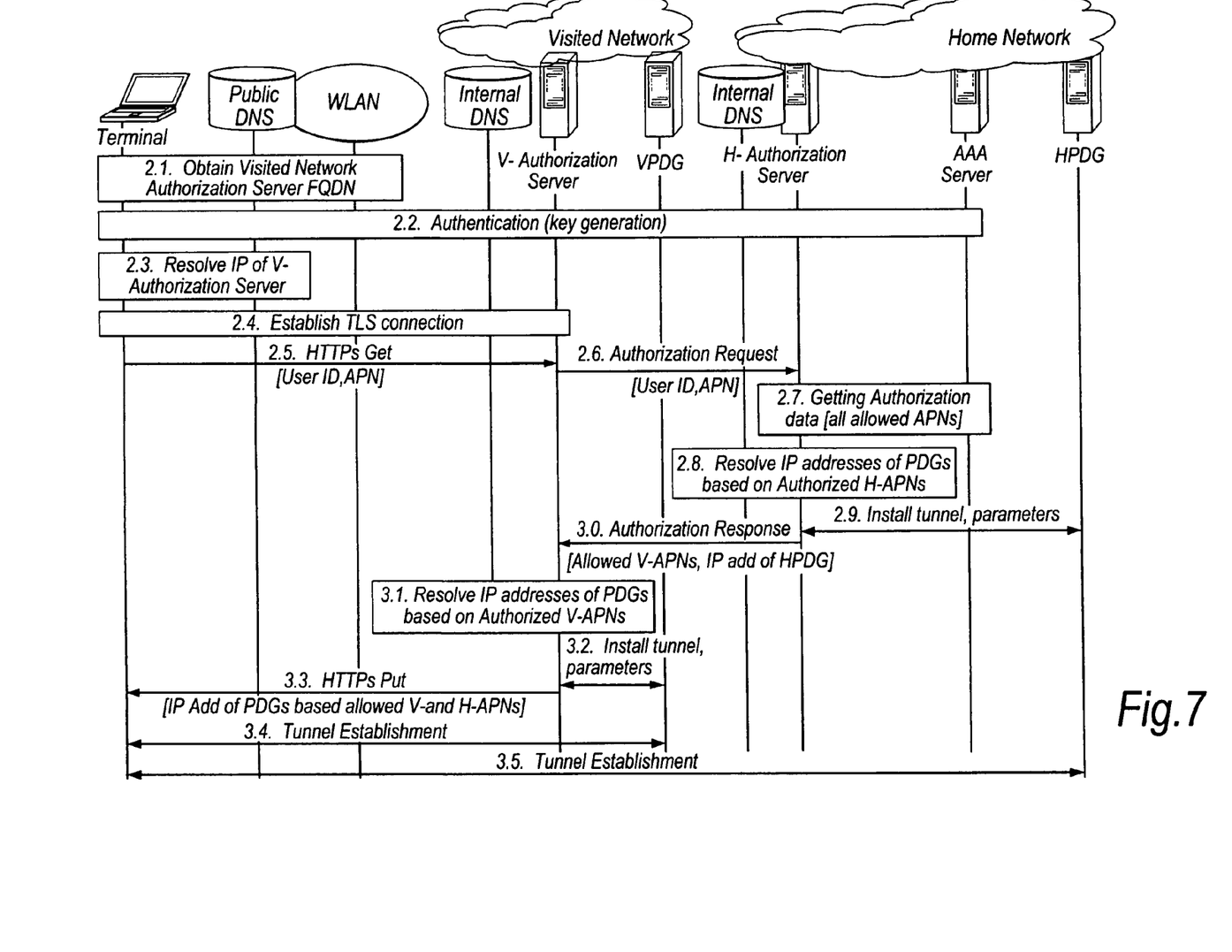
FIG. 7 is a sequential data flow diagram showing communications between different entities in a roaming scenario according to an embodiment of the invention.

FIG. 7 shows a roaming scenario. The individual steps in the service authorization are explained below:

21. The terminal obtains the FQDN of the Visited or V-Authorization server in a network selection phase. This step is mandatory because more information is required in the roaming scenario than in the home network.

22. Authentication takes place between the terminal and AAA server, and a security key is also generated.

23. The terminal resolves the IP address of the V-Authorization Server from the visited DNS server in the WLAN. There will not be many authorization server in any operator's network and their IP addresses will not change often. So allowing the V-Authorization Servers IP address to be resolved in a public DNS server does not have much negative impact on the operator's network.

24. Based on the key generated during authentication, the terminal establishes a TLS connection with the V-Authorization Server.

25. The user chooses the service and the terminal sends a HTTPs GET containing the user id and requested APN to the V-Authorization server.

26. The V-Authorization Server proxies the request to the home or H-Authorization Server.

27. The H-Authorization server retrieves user subscription data from the home AAA Server. The AAA Server authorises all the services which the user is allowed to access including visited or V-APNs and have H-APNs in the home network and returns all the corresponding APNs to the H-Authorization Server.

28. The H-Authorization Server resolves the IP addresses of the home PDGs or HPDGs based on H-APNs from an internal DNS server.

29. The H-Authorization Server then installs the tunnel parameters to the HPDGs such as user id, tunnel id, QoS parameters.

30. The H-Authorization Server returns V-APNs and IP addresses of HPDGs to the V-Authorization Server.

31. The V-Authorization Server resolves the IP addresses of the visited PDGs or VPDGs based on V-APNs from an internal DNS server.

32. The V-Authorization Server then installs the tunnel parameters to the VPDGs e.g. user id, tunnel id, QoS parameters.

33. The V-Authorization Server returns an HTTPs PUT containing the IP addresses of the HPDGs and VPDGs and corresponding tunnelling parameters.

34. The Browser application in the terminal can display a webpage like interface to the user indicating all the services the user can access and the user can choose a service by clicking a link.

35. No further tunnelling set-up is needed because all available tunnels have been prepared.

In this example the user chooses the service requested and receives all possible services. In another example, the user request could return authorization for that service only. Potentially, there may be no specific service request or a request for all available services. The skilled reader would appreciate that all three possibilities may be provided on the same UE as alternatives.

Figure 8:
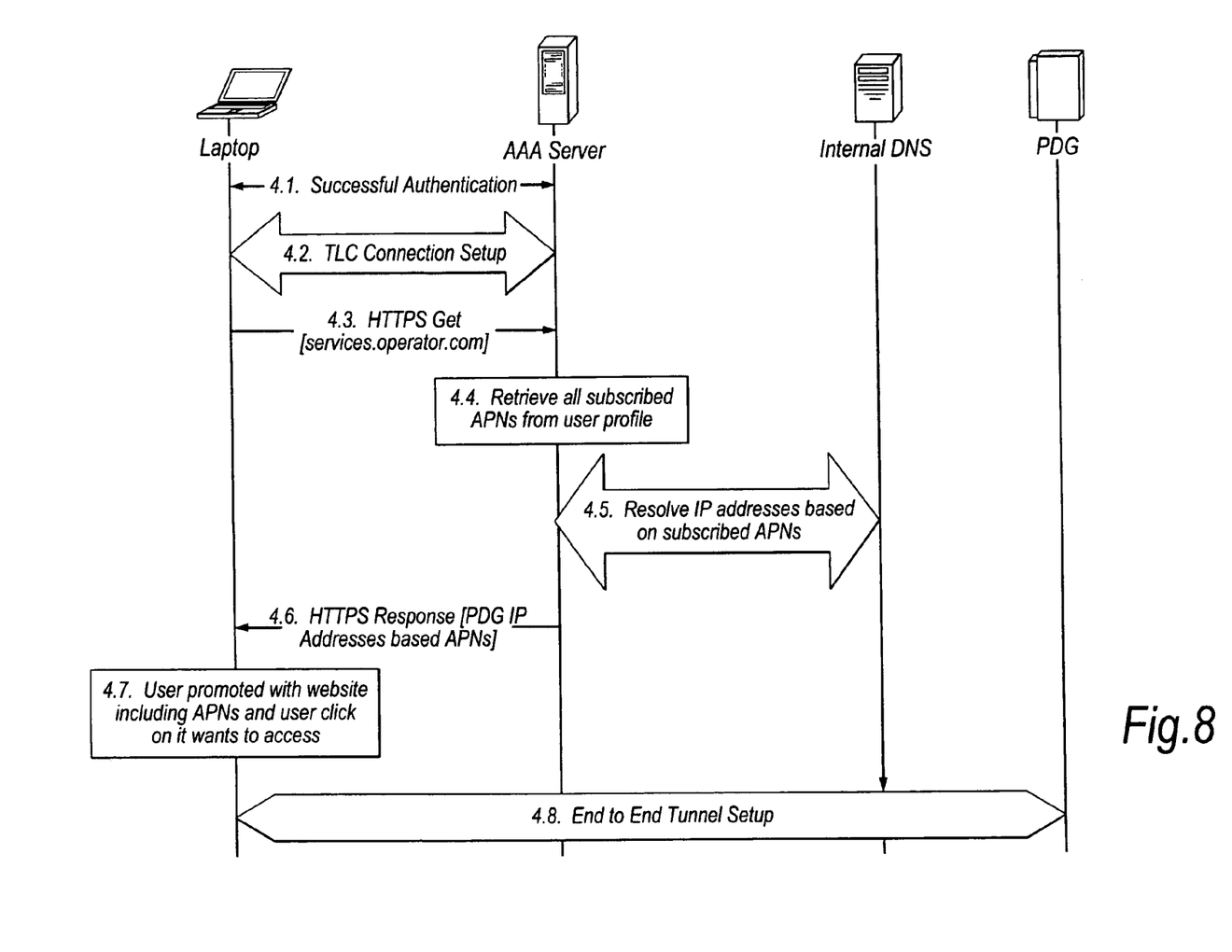
FIG. 8 is a sequential flow diagram showing communications between different entities according to another embodiment of the invention.

FIG. 8 shows an embodiment of the invention in which the AAA server acts as both the authorization and the authentication server. This server embodiment is shown without involvement of a public DNS server.

The authorization is carried out as follows:

41. The UE is authenticated with the AAA server using EAP-AKA and a shared security key is generated. After successful authentication, a URL identifying a location in the AAA server used for authentication can be returned to the user (or alternatively the URL is pre-configured in the terminal). The URL is used by the terminal to retrieve the PDG addresses from the 3G network 42. Based on the security key, the UE establishes a TLS secure connection with the AAA server. The terminal uses HTTPS to access the URL and the source of the URL will be located in an entity in a 3G network which is responsible for authorization (AAA Server in the example).

43. The UEs browser application sends a HTTP request to the AAA server for service authorization. No APN is required.

44. The AAA server retrieves all UE subscribed APNs from the user profile in an internal DNS.

45. The AAA server resolves the IP addresses of each APN using an internal DNS server.

46. The AAA server returns a list of IP addresses corresponding to each APN the user is subscribed to. The HTTPS response to the terminal contains the IP addresses of the PDGs against each user subscribed APN as a format of web page link. (The IP address is hidden, but the service name is presented to the end user).

47. The UE browser application displays service names corresponding to the IP addresses.

48. The UE selects the service to be accessed by clicking the link under the service name. This click triggers a tunnel set-up towards the IP address of that PDG.

The terminal can cache this returned HTTPS response for future access to services, so it saves network sources. When the operator has a new service available to the user or for some reason the operator changes its DNS setting (which results in the change of IP addresses against APNs), the operator can indicate in the successful authentication message that the terminal shall restart the HTTPS authorization.

It will be understood that the present invention has been described above purely by way of example, and modifications of details can be made within the scope of the invention. The various embodiments which have been described above may be implemented using software communications modules running on one or more processors provided of part of any of the entitles on the network (for example, to act as the means defined in the claims), for example a digital signal processor, or any other type of processor.

The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware or firmware.

The invention claimed is:

1. A method of user authorization for services in a wireless communications network including the steps of:
   establishing a connection between user equipment and an authorization server of the network;
   the user equipment providing user identification to the authorization server;
   the authorization server retrieving authorization data based on the user identification as to services available to the user;
   the authorization server installing tunneling parameters to gateways before returning authorization to the user equipment for a service indicated by the authorization data, the returned authorization including addresses of gateways and tunneling parameters; and
   the user equipment establishing a communication path to any of the services using the authorization.

2. A method according to claim 1 in which the connection between the user equipment and the authorization server is a secure connection with data encryption and in which communication between the user equipment and the authorization server is carried out under the secure connection.

3. A method according to claim 1 in which communication between the user equipment and the authorization server once the connection is established uses hypertext transfer protocol for document request and transfer.

4. A method according to claim 1 in which a browser application operating on the user equipment displays services available on return of the authorization and user selection of an available service allows establishment of the communication path.

5. A method according to claim 1 in which the communication path gives a tunnel forming a secure encrypted communication path between the user equipment and the service.

6. A method according to claim 1 in which a plurality of services may be authorised, the authorization server returning a single authorization including individual specific authorizations for specific services.

7. A method according to claim 6 in which the user equipment establishes a communication path to each specific service using the specific authorizations.

8. A method according to claim 1 in which the authorization is in the form of an address for each service available to the user, to which address the communication path is formed.

9. A method according to claim 1 in which the user equipment provides one or more service names to the authorization server at the same time as the user identification.

10. A method according to claim 1 in which the user equipment does not specify the service required when providing user identification.

11. A method according to claim 1 in which an initial authentication step is provided between the user equipment and an authentication server.

12. A method according to claim 11 in which the authentication and authorization servers are one and the same and the authorization data is retrieved internally from the authentication part of an authorization and authentication server.

13. A method according to claim 11 in which the authorization server is provided as a separate server from the authentication server and authorization data is retrieved by the authorization server from the authentication server within the core network.

14. A method according to claim 1 in which the authorization server installs communication path parameters for at least one service indicated by the authorization data to facilitate establishment of a communication path.

15. A method according to claim 1 in which user equipment has roamed to a visited network when outside the range of its home network; in which case the authorization server is a visited authorization server which relays user identification to a home authorization server, receives home authorization for any home service to be provided by the home network, retrieves visited user authorization data as to any visited service available to the user and returns authorization for any home service and authorizations for any visited service to be provided by the visited network.

16. A method according to claim 15, wherein the visited authorization service also receives information as to any visited service permitted by the home network.

17. A method according to claim 15 wherein a tunnel is established between the user equipment and a visited PDG for any visited service.

18. A method of user authorization for authorization of roaming services in a visited wireless communications network from a home wireless communications network including the steps of:
an authorization server of the home network receiving user identification from the visited network;
the home authorization server installing tunneling parameters to gateways before retrieving authorization data based on the user identification as to the home services available to the user from the home network, returning authorization the visited network for at least one home service indicated by the authorization data, the returned authorization including addresses of gateways and tunneling parameters; and
a communication path being established from the visited network to any of the home services using the authorization.

19. A method according to claim 18 wherein the home authorization server returns information as to any visited services permitted by the home network to be provided by the visited network.

20. A method according to claim 18 wherein a tunnel is established between the user equipment and a home PDG via the visited network for any home service.

21. A method according to claim 18 wherein either home or visited services are provided as a default and the other type of services are only provided when an equivalent default service is not available.

22. A wireless communications network in which the user requires authorization to utilise a service, comprising
user equipment and an authorization server configured to establish a secure connection therebetween;
the user equipment being furthermore configured to provide user identification to the authorization server; and
the authorization server being configured to install tunneling parameters to gateways before retrieving user authorization data based on the user identification as to services available to the user and to return authorization to the user equipment for a service indicated by the authorization data, the returned authorization including addresses of gateways and tunneling parameters; and
the user equipment being configured to establish a communication path to any of the services using the authorization.

23. A network according to claim 22 in which the connection between the user equipment and the authorization server is a secure connection with data encryption and the user equipment and the authorization server are configured to communicate under the secure connection.

24. A network according to claim 22 in which communication between the user equipment and the authorization server once the connection is established is using a hypertext transfer protocol for document request and transfer.

25. A network according claim 22 in which a browser application operating on the user equipment displays services available on return of the authorization and user selection of an available service allows establishment of the communication path.

26. A network according to claim 22 in which the communication path is a tunnel forming a secure encrypted communication path between the user equipment and the service.

27. A network according to claim 22 in which a plurality of services may be authorised, the authorization server returning a single authorization including individual specific authorizations for specific services.

28. A network according to claim 27, in which the user equipment is configured to establish a communication path to each specific service using the specific authorizations.

29. A network according to claim 22 in which the authorization is in the form of an address for each service available to the user.

30. A network according to claim 22 in which the user equipment provides a service name to the authorization server at the same time as the user identification.

31. A network according to claim 22 in which the user equipment does not specify the service required when providing user identification.

32. A network according to claim 22 in which the user equipment is configured to carry out an initial authentication step with an authentication server.

33. A network according to claim 32 in which the authentication and authorization servers are one and the same and the authorization data is retrieved internally from the authentication part of an authorization and authentication server.

34. A network according to claim 32 in which the authorization server is provided as a separate server from the authentication server and authorization data is retrieved by the authorization server from the authentication server within the core network.

35. A network according to claim 22 in which the authorization server installs communication path parameters for at least one service indicated by the authorization data to facilitate establishment of a communication path.

36. A network according to claim 22, in which the network acts as a visited network for user equipment which is outside the range of a home network, wherein the authorization server is configured as a visited authorization server, which relays user identification to a home authorization server of the user equipment, receives home authorization for any service provided by the home network, retrieves visited user authorization data as to any visited services available to the user and returns authorization for home services and any authorised visited services in the visited network.

37. A network according to claim 36 wherein the visited authorization server also receives information as to any visited service permitted by the home network.

38. A network according to claim 36 wherein tunnel establishment is between the user equipment and a visited PDG for any visited service.

39. A home wireless communications network in which the user requires authorization to utilise a home service, or a service provided by a visited wireless communications network when the user equipment is roaming, comprising:
- a home authorization server configured to receive user identification from the visited network;
- the home authorization server being configured to install tunneling parameters to gateways before retrieving user authorization data based on the user identification as to home services available to the user and to return home authorization to the visited network for a home service indicated by the authorization data, the returned home authorization including addresses of gateways and tunneling parameters; and
- at least one home server being configured to receive a communication path to any of the services using the authorization.

40. A network according to claim 39, wherein the home authorization server returns information as to any visited services permitted by the home network to be provided by the visited network.

41. A network according to claim 39, wherein tunnel establishment is between the user equipment and a home PDG via the visited network for any home service.

42. A network according to claim 39 wherein home or visited services are provided as a default and the other type of services are only provided when an equivalent default service is not available.

43. An authorization server providing user authorization configured to services in a wireless communications network comprising:
- hardware or software modules running on one or more processors that:
- establish a connection with user equipment;
- receive user identification from the user equipment;
- install tunneling parameters to gateways before retrieving authorization data based on the user identification as to services available to the user; and
- return authorization to the user equipment for a service indicated by the authorization data, the returned authorization including addresses of gateways and tunneling parameters, allowing the user equipment to establish a new communication path to any of the services using the authorization.

44. User equipment requiring user authorization configured to services in a wireless communications network comprising:
- hardware or software modules running on one or more processors that:
- establish a connection to an authorization server of the network;
- provide user identification to the authorization server;
- receive authorization for services available to the identified user returned by the authorization server which is configured to install tunneling parameters to gateways before returning the authorization, the returned authorization including addresses of gateways and tunneling parameters, and using it to establish a new communication path to any of the services.

* * * * *